Figures 1, 2:
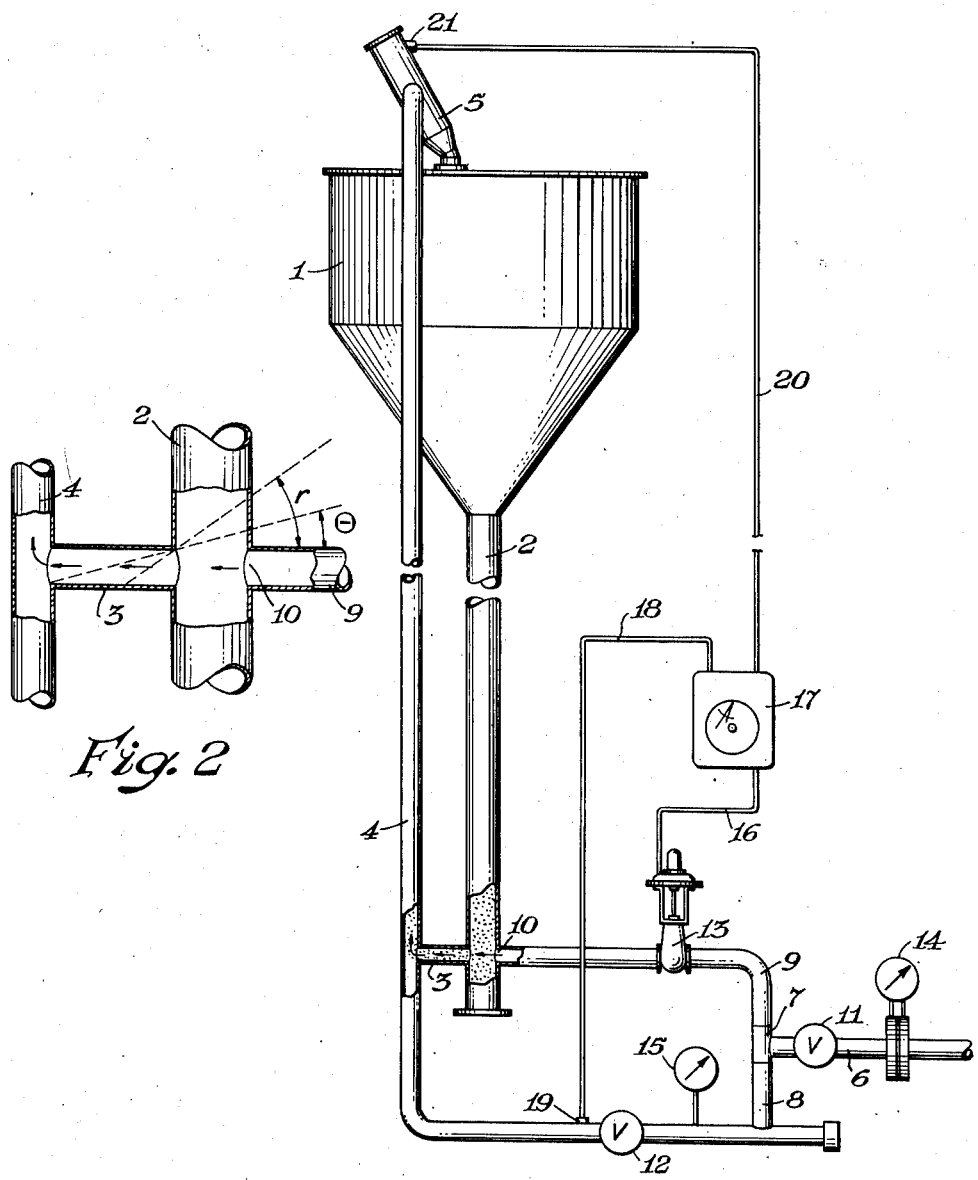

Dec. 30, 1952   H. W. HILL   2,623,793
PNEUMATIC CONVEYER AND FEEDER FOR LOOSE SOLIDS
Filed Dec. 24, 1949

INVENTOR.
Howard W. Hill
BY
Griswold & Burdick
ATTORNEYS

Patented Dec. 30, 1952

2,623,793

UNITED STATES PATENT OFFICE 2,623,793

PNEUMATIC CONVEYER AND FEEDER FOR LOOSE SOLIDS

Howard W. Hill, Concord, Calif., assignor to The Dow Chemical Company, Midland, Mich., a corporation of Delaware Application December 24, 1949, Serial No. 134,907

1 Claim. (Cl. 302—17)

This invention relates to pneumatic conveyors, such as a gas lift, for transferring loose subdivided solid materials, which is provided with a novel pneumatic feeder permitting close and accurate control of the rate of feeding such solids thereto.

A gas lift consists essentially of an ascending pipe conduit, into the lower end of which the loose solids are fed through an entry gate into a stream of air or other gas passing in upward direction through the pipe at a velocity sufficient to suspend and convey the solid particles to a discharge point. In many cases it is important to provide for a regulated flow of the solids at a uniform rate which may be varied at the will of the operator. Such a result is secured by accurately controlling the rate of feed of the solids to the lift pipe and the gas flow therein.

The solids to be fed to the gas lift are usually maintained in a body providing a static head sufficient to cause flow thereof by gravity into the lift pipe when the entry gate is open. For regulating the width of opening of the entry gate rotary valves, or slide valves and similar mechanical devices employing a variable orifice, have been used, but are subject to operating difficulties due to wedging or bridging of the particles, as well as to wear from abrasion and in some cases to corrosion of the metal parts. In all such devices a close and accurate regulation of the flow of particles therethrough cannot be obtained with certainty.

It is an object of the invention to provide means for feeding loose solid material into a gas lift or other pneumatic conveyor in controllable manner without dependence on valves or other mechanical devices having moving parts or a variable orifice. Another object is to secure a closer and more accurate control of the rate of flow of the loose solids into the conveyor. These and other objects and advantages of the invention are secured by the means hereinafter fully described and illustrated in the annexed drawing, in which Fig. 1 represents in elevation a preferred embodiment of the invention, and Fig. 2 is a detail in enlarged scale of the entry passage for loose solids shown in Fig. 1.

According to the invention the loose solids to be transferred by the pneumatic conveyor are maintained under a static head and fed into the same through an open passageway which is under pneumatic control to cause a flow of the solids therethrough in regulated manner at a rate proportional to the flow of a stream of control gas. The stream of control gas constitutes a portion of the operating gas stream of the conveyor, and its proportion to the total gas flow may be varied to vary the rate of feed of the solids. In this way the necessity for the use of any form of valve or other mechanical closure for the feed opening is avoided, while at the same time a better and more accurate control of the feed rate of solids is attained.

The invention may be most clearly described with reference to the drawing, wherein it is illustrated in the form of a gas lift. A supply of the loose solids which are to be elevated or conveyed by the gas lift is contained in receptacle 1. In particular cases the receptacle 1 may be a collector or storage bin, a chemical reactor, a heater or cooler, or other vessel containing a body of loose solids to be moved. Receptacle 1 is shown with inverted conical bottom, from the apex of which depends a standpipe 2 closed at its lower end, which is filled with the loose solids flowing by gravity from receptacle 1, the total height of the column of solids in standpipe 2 and receptacle 1 providing the static head of solids to be fed to the gas lift. Standpipe 2 is preferably vertical, but may be sloped or curved from the perpendicular to a degree which does not unduly restrict the fall of the loose solids therein.

Near the lower end of standpipe 2 is a laterally positioned tubular member 3, which joins the standpipe 2 with the conveyor or lift pipe 4, forming a feed passage or entry for the solids from the standpipe into the lift pipe. The dimensions of tube 3 are important. Its diameter is preferably equal to that of lift pipe 4, but may be somewhat less. Its length should be greater than its diameter such that loose solids flowing under head pressure from standpipe 2 into tube 3 and assuming their normal angle of repose therein will not reach the opening of tube 3 into lift pipe 4, but on the other hand the distance from the latter opening to the base of the loose solids freely entering the tube from standpipe 2 should not be so great that excessive frictional resistance will be interposed to the pneumatic feed of the solids through the tube as hereinafter described. I have found that the limiting length of tube 3 is determined by the relation of the angle of repose of the loose solids to the angle formed with the horizontal by a straight line drawn from the lower edge of the opening of tube 3 into lift pipe 4 to the upper edge of the opening of tube 3 into standpipe 2, which is denoted as angle $\theta$, as shown in Fig. 2. The ratio of the angle $\theta$ to the angle of repose $r$ should be less than 1/1 but greater than 1/4. That is, angle $\theta$ is less than angle $r$ but greater than $r/4$ and the length of tube 3 is determined accordingly. Under usual conditions a practical value is about $r/3$. The angle of repose of most loose solids of the type contemplated for handling according to the invention may be on the order of about 30° to 40°, depending upon the size, shape and density of the particles. While tube 3 is conveniently and preferably horizontal, it may be inclined upwardly or downwardly within limits such that the above stated relation of angle $\theta$ to angle $r$ is maintained.

Lift pipe 4 terminates at its upper end in a separator 5, wherein the solids are discharged and separated from the lift gas, whence they flow by gravity to a receiver. For simplicity of description the receiver is here shown as receptacle 1, whereby the system as illustrated recycles the solids from and to the same vessel. The invention is not limited thereby, however, and the receiver for the discharged solids may be other than that from which the solids are supplied to the gas lift.

Operating gas for the system, e. g. air, is supplied through pipe 6, which branches at junction 7, a portion of the gas supply passing through branch 8, which connects with lift pipe 4, and another portion passing through branch 9, which leads to the lower end of standpipe 2 at inlet 10 directly opposite or in close proximity to the opening of the lateral tube 3 thereinto. The gas flow in these pipes is controlled by a main shut-off valve 11 in pipe 6, throttle valve 12 in branch 8 and control valve 13 in branch 9. A meter 14 in pipe 6 measures the total gas flow, and a pressure gauge 15 indicates pressure therein. Control valve 13 is operatively connected by pipe 16 with pneumatic differential pressure controller 17, the differential pressure measuring element of which is connected by pipe 18 with tap 19 near the entrance of pipe 4 and by pipe 20 with tap 21 in separator 5. Thus controller 17 is actuated by the gas pressure differential of the lift, and in response thereto operates control valve 13.

As described, the gas flow for the lift is divided into two streams at the lower, or feed, end of the lift. One stream, which is controlled by valve 13 in response to the pressure differential of the lift, is directed through the mass of loose solids in the standpipe 2 opposite or adjacent to the feeder tube 3 to blow the solids through tube 3 into lift pipe 4. The height of the column of loose solids in standpipe 2 should be such that the weight of solids in the standpipe is substantially greater than the gas pressure differential between the bottom and the top of the same, when both values are expressed in terms of the same unit of cross-sectional area, in order to prevent interference with the downward flow of solids. The quantity of solids fed to the lift is proportional to the flow of gas through branch 9 and hence to the portion of total lift gas which is so diverted. If the total lift gas flow, pressure and temperature are constant, the pressure drop across the lift is a straight line function of the quantity of solids carried by the lift. Thus, by controlling the flow of gas to the feeder in response to the pressure differential of the lift, the flow rate of solids conveyed by the lift can be held at any desired point or varied at will.

In practice valve 11 in gas line 6 is set to deliver gas to lift any desired flow of solids up to the maximum capacity of the lift, and this setting is normally constant during operation of the lift. If the line pressure of the gas is subject to fluctuations, a flow controller of standard type for valve 11 may be installed. The portion of the total gas flow, which passes through branch 9 controlled by valve 13, determines the rate of solids feed, from zero to maximum capacity, through entry tube 3 into lift pipe 4. Valve 13 is actuated by controller 17 in response to the gas pressure differential of the lift. The pressure differential of the life varies directly with the rate of solids fed thereto, up to the maximum capacity of the lift for the particular solids carried by it. Thus a particular setting of the control point of controller 17 controls the opening of valve 13 and the rate of gas flow therethrough and its ratio to total gas flow to the lift, which in turn determines the rate of solids feed to the lift. When valve 13 is closed, the rate of solids feed is zero, while the rate of feed increases as the opening of valve 13 is increased. The apparatus is so designed that, with maximum gas flow through branch 9, at least one-quarter of the total gas flow will be through branch 8 direct to lift pipe 4. Throttle valve 12 in branch 8 is used when necessary to adjust the upstream pressure at valve 13 to correspond to the fraction of total gas flow that is to be passed through the latter valve. Such throttling may be done by manual operation of valve 8, which is suitable for conditions giving a steady feed rate, or, if desired, may be done automatically, particularly when frequent variations in feed rate are to be made, by installing a standard pressure controller actuated according to the pressure indication of gauge 15.

In the manner described the solids feed to the gas lift may be automatically and accurately controlled at any desired rate from zero to maximum capacity by controlling the proportion of the total lift gas flow which is used to operate the pneumatic feeder. The invention is not limited to a gas lift in a narow sense, but is applicable generally to pneumatic conveyors, wherein a flowing stream of carrier gas in a conduit is employed to transport loose solids from a feed point to a discharge point.

The control of solids feed according to the invention is useful in processes involving the continuous conveyance of subdivided solids at a predetermined uniform rate or at variable rates which must be accurately regulated. For example, in certain catalytic chemical processes, as in the catalytic cracking of oil, where there is a continuous gravity flow of a body of subdivided solid catalyst through a reaction or cracking zone, or through a heating, cooling or regenerating zone, the recirculation of the catalyst or its conveyance from one zone to another can be effected by means of a gas lift under close and accurate control by use of the combination herein described.

I claim:

In a pneumatic conveyor for subdivided solids, the combination of a standpipe for gravity supply of the solids, a conduit through which the solids are to be conveyed from a feed point to a discharge point, a feeder consisting of an open tube joining and communicating with said standpipe and said conduit, said feeder having a length such that the ratio of angle $\theta$ to the angle of repose $r$ of the subdivided solids is less than 1/1 but greater than 1/4, where angle $\theta$ is the angle formed with the horizontal by a straight line drawn through the lower edge of the opening of said feeder into said conduit and the upper edge of the opening of said feeder into said standpipe, a valve-controlled main gas supply line communicating through a first branch with said conduit and through a second branch with said standpipe in close proximity to the opening of said feeder thereinto, a throttle valve in said first branch and a control valve in said second branch operatively connected with a pneumatic differential pressure controller actuated in response to the gas pressure differential between the feed point and discharge point of said conduit, to control the rate of feed of solids through said feeder by the gas flow in said second branch.

HOWARD W. HILL.

REFERENCES CITED

The following references are of record in the file of this patent:

UNITED STATES PATENTS

| Number | Name | Date |
|---|---|---|
| 749,206 | Limbert | Jan. 12, 1904 |
| 760,775 | Bowland | May 24, 1904 |
| 1,901,932 | Schaub | Mar. 21, 1933 |
| 1,935,843 | Goebels | Nov. 21, 1933 |